(12) United States Patent
Metayer et al.

(10) Patent No.: US 8,233,200 B2
(45) Date of Patent: Jul. 31, 2012

(54) CURVATURE CORRECTION AND IMAGE PROCESSING

(75) Inventors: Frank J. Metayer, West Warwick, RI (US); Carlos Cervantes Toral, Barcelona (ES); Duncan D. Xue, Cumberland, RI (US)

(73) Assignee: GTech Corporation, Providence, RI (US)

( * ) Notice: Subject to any disclaimer, the term of this patent is extended or adjusted under 35 U.S.C. 154(b) by 846 days.

(21) Appl. No.: 12/323,701

(22) Filed: Nov. 26, 2008

(65) Prior Publication Data

US 2009/0074327 A1   Mar. 19, 2009

Related U.S. Application Data

(63) Continuation-in-part of application No. 11/376,052, filed on Mar. 14, 2006, now Pat. No. 7,920,299.

(60) Provisional application No. 60/661,698, filed on Mar. 14, 2005.

(51) Int. Cl.
*H04N 1/04* (2006.01)

(52) U.S. Cl. ..... 358/474; 358/488; 358/483; 348/222.1; 382/102

(58) Field of Classification Search ............... 358/471, 358/474, 1.15, 488, 482, 483; 348/208.14, 348/222.1, 234; 382/103, 199, 294
See application file for complete search history.

(56) References Cited

U.S. PATENT DOCUMENTS

| | | | |
|---|---|---|---|
| 4,141,036 A | 2/1979 | Diehl | |
| 4,240,748 A | 12/1980 | Blanc et al. | |
| 4,724,307 A | 2/1988 | Dutton et al. | |
| 4,736,109 A | 4/1988 | Dvorzsak | |
| 4,760,247 A | 7/1988 | Keane et al. | |
| 4,933,778 A * | 6/1990 | Tufano et al. | 358/488 |
| 5,039,847 A | 8/1991 | Morii et al. | |
| 5,103,490 A * | 4/1992 | McMillin | 382/284 |
| 5,214,470 A * | 5/1993 | Denber | 355/75 |
| 5,216,595 A | 6/1993 | Protheroe | |
| 5,239,165 A | 8/1993 | Novak | |
| 5,258,605 A | 11/1993 | Metlitsky et al. | |
| 5,262,624 A | 11/1993 | Koch | |

(Continued)

FOREIGN PATENT DOCUMENTS

EP   1 172 756 A1   1/2002

(Continued)

OTHER PUBLICATIONS

European Patent Application No. 09166997.8, filed Mar. 14, 2006: Search Report, dated Sep. 9, 2009 (8 pages).

(Continued)

*Primary Examiner* — Negussie Worku
(74) *Attorney, Agent, or Firm* — McCarter & English, LLP; Kia L. Freeman, Esq.

(57) ABSTRACT

A system and process for reading forms using a curvature distortion correction scheme is disclosed. A model image of a known form is partitioned into sectors defined by at least three alignment marks, and a transfer or correction function for each sector is generated by comparing the locations of alignment marks on a captured unread image of a form to those on a model image. The transfer function is then applied to the other marks within the sector to calculate a correct location of the marks. Each sector is sized to reasonably ensure curvature distortions are handled such that all the marks on a form are properly found and interpreted. Errors may be checked and, if they persist, smaller sectors may be defined and employed, if available.

20 Claims, 7 Drawing Sheets

U.S. PATENT DOCUMENTS

| | | | |
|---|---|---|---|
| 5,362,105 | A | 11/1994 | Scott |
| 5,417,424 | A | 5/1995 | Snowden et al. |
| 5,452,379 | A | 9/1995 | Poor |
| 5,673,125 | A | 9/1997 | Merecki et al. |
| 5,734,153 | A | 3/1998 | Swartz et al. |
| 5,735,094 | A * | 4/1998 | Zember .................... 52/314 |
| 5,818,026 | A | 10/1998 | Melling et al. |
| 5,821,518 | A | 10/1998 | Sussmeier et al. |
| 5,834,749 | A | 11/1998 | Durbin |
| 5,945,655 | A | 8/1999 | Gilgeous et al. |
| 6,150,930 | A | 11/2000 | Cooper |
| 6,157,435 | A | 12/2000 | Slater et al. |
| 6,176,429 | B1 | 1/2001 | Reddersen et al. |
| 6,199,044 | B1 | 3/2001 | Ackley et al. |
| 6,223,986 | B1 | 5/2001 | Bobba et al. |
| 6,234,899 | B1 | 5/2001 | Nulph |
| 6,262,670 | B1 | 7/2001 | Ballou |
| 6,289,125 | B1 * | 9/2001 | Katoh et al. ................ 382/194 |
| 6,340,114 | B1 | 1/2002 | Correa et al. |
| 6,356,365 | B1 | 3/2002 | Oida et al. |
| 6,357,658 | B1 | 3/2002 | Garczynski et al. |
| 6,366,696 | B1 | 4/2002 | Hertz et al. |
| 6,470,099 | B1 * | 10/2002 | Dowdy et al. ................ 382/287 |
| 6,494,372 | B2 | 12/2002 | Bruchlos et al. |
| 6,650,427 | B2 | 11/2003 | Brooks et al. |
| 6,722,569 | B2 | 4/2004 | Ehrhart et al. |
| 6,736,319 | B2 | 5/2004 | Swanson et al. |
| 6,760,476 | B2 | 7/2004 | Meder |
| 6,776,337 | B2 | 8/2004 | Irwin, Jr. et al. |
| 6,816,630 | B1 * | 11/2004 | Werth et al. ................. 382/287 |
| 6,875,105 | B1 | 4/2005 | Behm et al. |
| 6,887,153 | B2 | 5/2005 | Walker et al. |
| 6,929,184 | B2 | 8/2005 | Barkan |
| 6,954,290 | B1 * | 10/2005 | Braudaway et al. ......... 358/3.26 |
| 6,971,577 | B2 | 12/2005 | Tsikos et al. |
| 7,060,968 | B1 | 6/2006 | Leviton |
| 7,070,115 | B2 * | 7/2006 | DeBiase ..................... 235/494 |
| 7,090,131 | B2 | 8/2006 | Natsuno |
| 7,124,945 | B2 | 10/2006 | Kim |
| 7,206,008 | B2 * | 4/2007 | Dejong et al. ............... 347/116 |
| 7,247,095 | B2 | 7/2007 | Nulph |
| 7,317,557 | B2 * | 1/2008 | Pollard et al. ............... 358/448 |
| 7,527,206 | B2 | 5/2009 | Zhu et al. |
| 7,574,047 | B2 * | 8/2009 | Cichielo et al. ............. 382/184 |
| 7,635,088 | B2 | 12/2009 | Chung et al. |
| 7,674,171 | B2 | 3/2010 | Walker et al. |
| 8,117,635 | B2 * | 2/2012 | Hendricks et al. ............. 725/34 |
| 2001/0025880 | A1 | 10/2001 | Bruchlos et al. |
| 2001/0029513 | A1 | 10/2001 | Kuwano et al. |
| 2002/0010022 | A1 | 1/2002 | Vincent |
| 2002/0048403 | A1 | 4/2002 | Guerreri |
| 2002/0109866 | A1 | 8/2002 | Yang et al. |
| 2003/0102376 | A1 | 6/2003 | Meier et al. |
| 2003/0173404 | A1 | 9/2003 | Chung et al. |
| 2003/0186734 | A1 | 10/2003 | LeMay et al. |
| 2004/0029630 | A1 | 2/2004 | Walker et al. |
| 2004/0160652 | A1 | 8/2004 | Kimura et al. |
| 2004/0209665 | A1 | 10/2004 | Walker et al. |
| 2004/0218835 | A1 | 11/2004 | Loew |
| 2005/0092841 | A1 | 5/2005 | Barkan |
| 2005/0098633 | A1 | 5/2005 | Poloniewicz et al. |
| 2005/0161511 | A1 | 7/2005 | Parker et al. |
| 2005/0163385 | A1 | 7/2005 | Thakur |
| 2005/0233797 | A1 | 10/2005 | Gilmore et al. |
| 2005/0237580 | A1 | 10/2005 | Coleman et al. |
| 2005/0238260 | A1 | 10/2005 | Coleman et al. |
| 2006/0063589 | A1 | 3/2006 | Chong |
| 2006/0079311 | A1 | 4/2006 | Nulph |
| 2006/0122910 | A1 | 6/2006 | Chau et al. |
| 2006/0152595 | A1 | 7/2006 | Ryu et al. |
| 2006/0221354 | A1 | 10/2006 | Slaten et al. |
| 2006/0255145 | A1 | 11/2006 | Chung et al. |
| 2006/0290886 | A1 | 12/2006 | Santos |
| 2006/0291004 | A1 | 12/2006 | Dymetman |
| 2007/0109511 | A1 | 5/2007 | Kelly et al. |
| 2008/0240614 | A1 | 10/2008 | Garcia |
| 2009/0015883 | A1 | 1/2009 | Kim |
| 2009/0020606 | A1 | 1/2009 | Chung et al. |
| 2009/0021798 | A1 | 1/2009 | Abahri |
| 2009/0051814 | A1 | 2/2009 | Shirane et al. |
| 2009/0167960 | A1 | 7/2009 | Miyasato |
| 2010/0060943 | A1 | 3/2010 | Monga et al. |

FOREIGN PATENT DOCUMENTS

| | | |
|---|---|---|
| EP | 1 441 315 A1 | 7/2004 |
| WO | WO 00/04487 A1 | 1/2000 |
| WO | WO 01/04571 A1 | 1/2001 |
| WO | WO 2007/114241 A1 | 10/2007 |

OTHER PUBLICATIONS

Euorpean Patent No. 1 861 809: Notice of Opposition, dated Feb. 4, 2010, and Facts and Arguments in Support of Opposition (24 pages).

International Patent Application No. PCT/US2006/009362: International Search Report and Written Opinion; Date of mailing: Sep. 21, 2006 (16 pages).

International Patent Application No. PCT/US2009/057610: International Search Report and Written Opinion; Date of mailing: May 19, 2010 (9 pages).

International Patent Application No. PCT/US2009/058018: International Search Report and Written Opinion; Date of mailing: Jan. 25, 2010 (9 pages).

U.S. Appl. No. 12/234,992, filed Sep. 22, 2008: Office Action, dated Mar. 16, 2011.

U.S. Appl. No. 12/236,843, filed Sep. 24, 2008: Office Action, dated Nov. 22, 2010.

U.S. Appl. No. 12/236,843, filed Sep. 24, 2008: Notice of Allowance, dated May 11, 2011.

U.S. Appl. No. 13/026,712, filed Feb. 14, 2011: Office Action, dated Jun. 13, 2011.

International Search Report and Written Opinion dated Mar. 8, 2010, International Application No. PCT/US2009/065660.

Boone, J.M. et al., "Analysis and Correction of Imperfections in the Image Intensifier-TV-Digitizer Imaging Chain," Medical Physics, vol. 18, No. 2, Mar. 1991.

Fantozzi, Silvia et al., "A Global Method Based on Thin-plate Splines for Correction of Geometric Distortion: An Application to Fluoroscopic Images," Medical Physics, vol. 30, No. 2, Feb. 2003.

Glasbey, C.A. et al., "A Review of Image Warping Methods," Journal of Applied Statistics, vol. 25, No. 2, Apr. 1998.

* cited by examiner

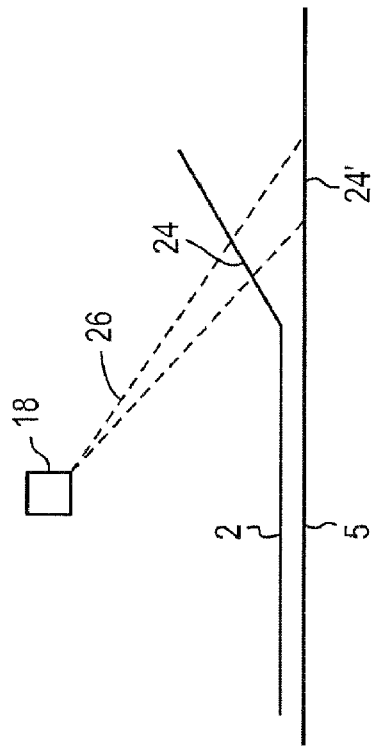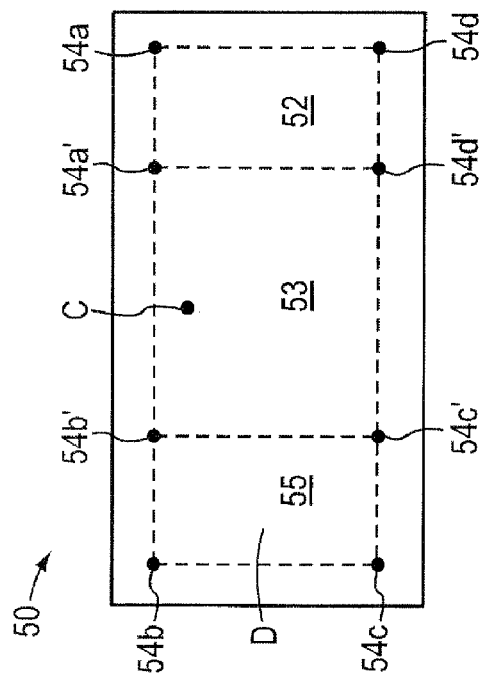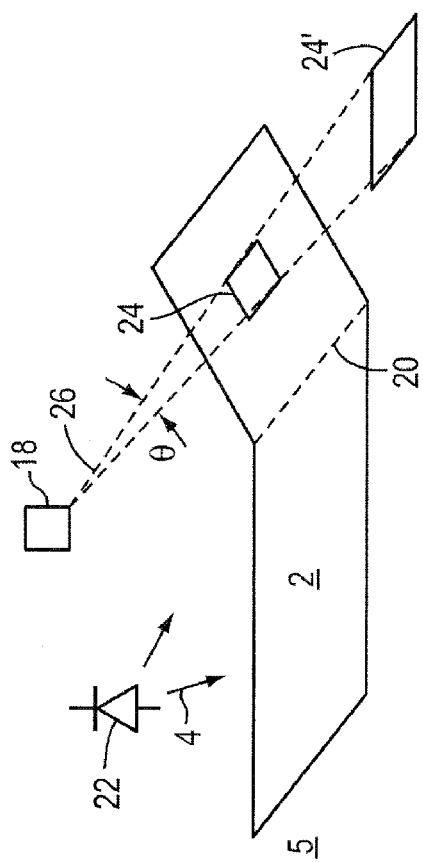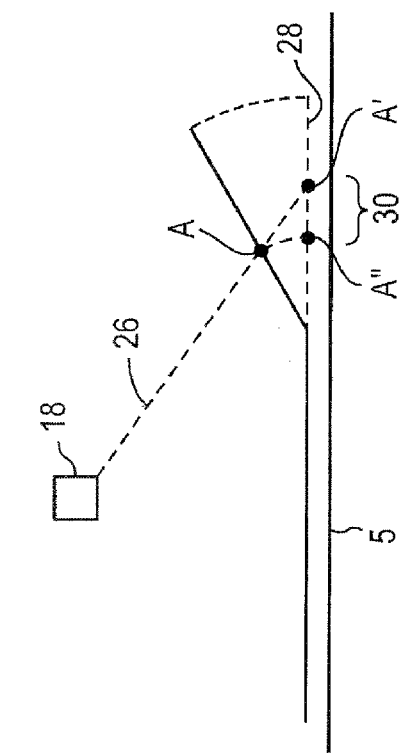

LOTTO

BOARD A
[1] [2] [3] [4] [5] [6] [7]
[8] [9] [10] [11] [12] [13] [14]
[15] [16] [17] [18] [19] [20] [21]
[22] [23] [24] [25] [26] [27] [28]
[29] [30] [31] [32] [33] [34] [35]
[36] [37] [38] [39] [40] [41] [42]
[43] [44] [45] [46] [47] [48] [49]
[QP]                         [VOID]

BOARD B
[1] [2] [3] [4] [5] [6] [7]
[8] [9] [10] [11] [12] [13] [14]
[15] [16] [17] [18] [19] [20] [21]
[22] [23] [24] [25] [26] [27] [28]
[29] [30] [31] [32] [33] [34] [35]
[36] [37] [38] [39] [40] [41] [42]
[43] [44] [45] [46] [47] [48] [49]
[QP]                         [VOID]

BOARD C
[1] [2] [3] [4] [5] [6] [7]
[8] [9] [10] [11] [12] [13] [14]
[15] [16] [17] [18] [19] [20] [21]
[22] [23] [24] [25] [26] [27] [28]
[29] [30] [31] [32] [33] [34] [35]
[36] [37] [38] [39] [40] [41] [42]
[43] [44] [45] [46] [47] [48] [49]
[QP]                         [VOID]

BOARD D
[1] [2] [3] [4] [5] [6] [7]
[8] [9] [10] [11] [12] [13] [14]
[15] [16] [17] [18] [19] [20] [21]
[22] [23] [24] [25] [26] [27] [28]
[29] [30] [31] [32] [33] [34] [35]
[36] [37] [38] [39] [40] [41] [42]
[43] [44] [45] [46] [47] [48] [49]
[QP]                         [VOID]

BOARD F
[1] [2] [3] [4] [5] [6] [7]
[8] [9] [10] [11] [12] [13] [14]
[15] [16] [17] [18] [19] [20] [21]
[22] [23] [24] [25] [26] [27] [28]
[29] [30] [31] [32] [33] [34] [35]
[36] [37] [38] [39] [40] [41] [42]
[43] [44] [45] [46] [47] [48] [49]
[QP]                         [VOID]

BOARD F
[1] [2] [3] [4] [5] [6] [7]
[8] [9] [10] [11] [12] [13] [14]
[15] [16] [17] [18] [19] [20] [21]
[22] [23] [24] [25] [26] [27] [28]
[29] [30] [31] [32] [33] [34] [35]
[36] [37] [38] [39] [40] [41] [42]
[43] [44] [45] [46] [47] [48] [49]
[QP]                         [VOID]

Weeks [1] [2] [4] [8] [12] [24]

[S] [M] [T] [W] [TH] [F] Draws

Mark 6 Numbers on Each Board.
Mark Boxes Like This:   [X]

CURVATURE CORRECTION AND IMAGE PROCESSING

RELATED APPLICATIONS

The present invention is a continuation-in-part of U.S. patent application Ser. No. 11/376,052, filed Mar. 14, 2006 now U.S. Pat. No. 7,920,299 and entitled SYSTEM AND METHOD FOR PROCESSING A FORM, that claims priority from U.S. Provisional Patent Application Ser. No. 60/661,698, filed on Mar. 14, 2005. These patent applications are of common ownership with the present invention, and they are incorporated herein by reference.

BACKGROUND OF THE INVENTION

1. Field of the Invention

The present invention relates to an optical reader system employing a camera to capture a digital data image of an unread form and a computer system for processing the digital data to correct for distortions and derive and interpret information from the digital data. Herein, "camera" includes any photo-sensitive device that captures a scene in a photo-sensitive media that may be downloaded or read-out by a computer processing system that stores in memory the digital data representing the scene. Lenses, filters, apertures, etc., and a photo-sensitive surface, array, or arrays for holding the scene image may be included in the term "camera."

2. Background Information

Printed documents, play slips, lottery scratch tickets, lottery instant tickets and the like are collectively defined herein as "forms." Forms, often, have man-made marks at locations indicating a specific intent of the human. Correctly identifying a form and reading or processing the printed and man-made markings are not simple tasks.

Some of these tasks include: detecting the presence of the form, determining that the form is still or motion-less, identifying the existence of marks on the form, locating the marks on the form; and, then interpreting the meaning of the marks. For each task, there must be enough light to illuminate the form with enough contrast with respect to the background to detect and identify those marks.

In order to identify a form, printed markings may be detected and interpreted, or a human may indicate the form type. The printed markings will normally include logos or other special marks used to identify the form type. In addition, alignment marks may be printed and used by the processing system to accurately identify locations on the form. Then, the markings on the form may be accurately located and interpreted for their meaning.

The processing and identifying of marks on the form begins with a camera that captures an image of the form. The captured image may be downloaded, stored and analyzed by a computing system. Analyzing the image may be accomplished by an "application" that may be software running in a computer system, firmware embedded in a hardware framework, a hardware state machine, or a combination thereof.

One important and common problem when reading forms occurs when the form is bent, crumpled, rolled or folded, thereby creating distortions. Distortions are a major cause for errors in reading or rejecting a form. Distortions manifest, at least, as location and resolution errors.

Some prior art readers have drive mechanisms that flatten and position a form into an enclosed chamber. Such drive mechanisms are expensive and require routine service and technical support to maintain them, all leading to additional costs and expense in ownership.

Prior art attempts at compensating for distortions have been ineffectual and a convenient, reliable, comparatively inexpensive easy to use reader that corrects, reduces and/or compensates for such distortions would benefit the industry.

SUMMARY OF THE INVENTION

The present invention is directed to an optical reader that is capable of reading a wide assortment of forms and, more particularly, capable of reading forms that have been bent, rolled, crumpled, or folded, by using a system and a process for distortion correction. According to at least one embodiment of the present invention, model images of known form types such as, for example, printed documents, play slips, lottery scratch tickets or lottery instant tickets are stored on a computer system. Along with the model images, information is stored on the computer system that includes known logo or other form identifying marks and alignment marks that partition each model image into areas or sectors that are defined by at least three non-colinear alignment marks. The locations, attributes (see below) and the corresponding meanings of alignment marks, logos, other such identifying marks, and the locations of possible hand drawn marks and their meanings are also stored with each model image.

A coordinate system such as, for example, Cartesian, polar, etc., describes locations on a model image and on any captured images of unread forms. In a Cartesian coordinate system, for example, x and y may define locations on the model image, and x' and y' may be used for locations on a unread image of a form.

A transfer function may be applied to an apparent location of any mark within a sector of the unread image to yield a corrected location. The apparent location may then be compared to the corresponding location on the model image and that location may determine the mark's meaning. All the sections having marks therein may be processed in a like manner.

"Transfer function" is a phrase used herein that may be termed by others as "translation function," or "equation," or "correction function," or "factor," or other such terms or combinations of terms as may be found in the art.

Attributes may refer to shapes, sizes, the center of mass of the mark, etc. The location and the attributes of a mark may define an alignment mark or a logo. The type of form may be determined by a logo, or some other printed mark or marks, or may be manually made by an agent. For example, a pencil mark at a specific location on the form may indicate a selection by a human completing a form such as when playing a game.

An alignment mark on an unread image is easily detected and recognized by a computer system. The mark, found at a specific location, has attributes (large, round, square, oblong, long linear or any shape) that accommodate its detection as an alignment mark Logos are marks similar to alignment marks in their ease of detection and identification, and, as mentioned above, may be used to identify the type of form.

Partitioning a form into sectors allows for correction of curvature distortion by sizing the sectors. Smaller sectors may be relatively flat where curves in such a sector do not manifest to cause errors in reading marks in the sector.

Where a sector is defined by three non-colinear points, the following equations may represent a transfer function that corrects scaling, translation and rotation of marks within that sector:

$$x' = A'x + B'y + C' \qquad \text{Eq. 1, and}$$

$$y' = D'x + E'y + F' \qquad \text{Eq. 2.}$$

Once the six coefficients (A', B', C', D', E', and F') are derived for a specific captured image of the form, Equations 1 and 2 may be used to translate any location (x, y) in the model image to the corresponding coordinate (x', y') in the unread image of the form.

Where a sector is defined by four non-colinear points that define a four sided sector area, the following equations may represent a transfer function that corrects for scaling, translation, rotation and for perspective issues associated with a camera capturing the unread sector of a form:

$$x' = \frac{Ax + By + C}{Gx + Hy + 1}, \quad \text{Eq. 3}$$

and $$y' = \frac{Dx + Ey + F}{Gx + Hy + 1}. \quad \text{Eq. 4}$$

Once the eight coefficients (A, B, C, D, E, F, G, and H) are derived for a specific unread image of the form, Equations 3 and 4 may be used to translate any location (x, y) in the model image to the corresponding coordinate (x', y') in the unread image of the form.

The coefficients of the above transfer function equations are found by comparing the actual x', y' locations of specific marks in the unread image to the corresponding x, y locations in the model image. In order to cover an area of the form, at least three non-colinear known alignment marks may be processed, however, four or more marks may be used to advantage. A system of equations result where the coefficients may be found by use of matrix algebra techniques as illustrated below.

In the following illustration, eight alignment marks are used to define a sector. According to this illustration, when eight alignment marks are used to define the sector, the following biquadratic transfer function equation (Equation 7) may be applied and correct for scaling, translation, rotation and perspective issues associated with a camera capturing the unread sector of a form:

$$x' = a_1 + a_2 x + a_3 y + a_4 xy + a_5 x^2 + a_6 y^2 + a_7 xy^2 + a_8 x^2 y \quad \text{Eq. 7}$$

$$\equiv \sum_{n=1,8} a_n u_n(x, y) = UA''$$

$$y' = b_1 + b_2 x + b_3 y + b_4 xy + b_5 x^2 + b_6 y^2 + b_7 xy^2 + b_8 x^2 y$$

$$\equiv \sum_{n=1,8} b_n u_n(x, y) = UB''$$

After a form type is known and a transfer function is derived for every sector in the form, the same sectoring may be applied to the stored unread image and the transfer functions may be applied to the locations of the marks within every sector on the unread image. This results in corrected locations for the marks, if any, within each sector. The corrected locations of these other marks then may be compared to corresponding locations on the model image. The locations on the model image have stored meanings that determine the meanings of those other marks whose corrected locations match those of the model image.

In some applications, however the transfer function may be applied to areas immediately outside that area If a sector includes other alignment marks or marks of known locations, those other marks may be used to calculate an error. The locations of those other marks on the stored unread image may be detected and their locations may be corrected by application of the transfer function. The corrected location may be compared to the actual location from the model image and an error may be calculated. An error threshold may be established, and if the error in any sector exceeds the threshold, the form may be rejected.

In other applications, other, closer alignment marks may be used to form yet another sector and another transfer function may be applied. This process may continue until there are no smaller sectors with acceptable errors, wherein the form may be rejected. If an acceptable error is formed for every sector in the form where a mark exists, the marked form may be accepted and may then be processed by the system.

It will be appreciated by those skilled in the art that although the following Detailed Description will proceed with reference being made to illustrative embodiments, the drawings, and the described methods of use, the present invention is not intended to be limited to these embodiments or methods of use. Rather, the present invention is of broad scope and is intended to be defined as only set forth in the accompanying claims.

BRIEF DESCRIPTION OF THE DRAWINGS

The invention description below refers to the accompanying drawings, of which:

FIGS. 2A, 2B and 2C are a series of illustrations of curvature problems;

FIG. 4 is a layout of a form with markings;

DETAILED DESCRIPTION OF AN ILLUSTRATIVE EMBODIMENT

Figure 1:
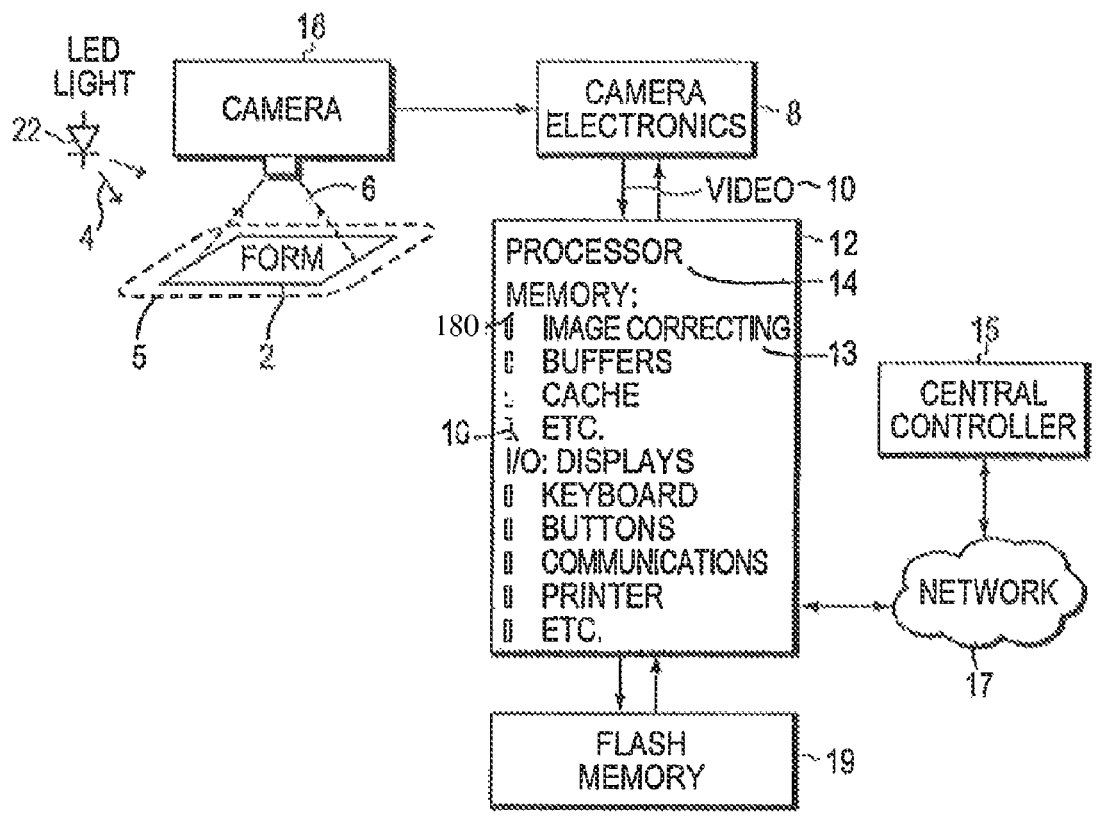
FIG. 1 is a system block diagram of a system embodying the present invention.

FIG. 1 illustrates a form 2 being illuminated by a light source 4 with the reflected light 6 from the form 2 being received by a camera 18. The form may, for example, represent a printed document, a play slip, a lottery scratch ticket or a lottery instant ticket. The form 2 may be located on a platen 5 positioned a few inches to a foot or more away from the camera 18. The arrangement allows the entire form 2 to be viewed by the camera 18, although sections of the camera scene, and, thus, the form 2 may be processed in sequence. An image is impressed on the cameras photo-sensitive surface and may be downloaded (scanned or read-out) by camera electronics 8 to produce a video signal 10, that is digitized and stored as pixels or pixel data, and where a processor 14 in a computer processing system 12, preferably a micro-processor, operates on the pixel data. The computer processing system 12 includes memory 180 and I/O device drivers 16 for handling, at least, displays, keyboards, buttons, printers, and communications. The computer processing system 12, in turn, may be connected with a computer network 17.

Memory 180 may include, at least, one or more image buffers, other buffers, cache, etc. An operating system and software applications may be stored in the memory 180. A processing application 13, discussed below, includes the processes for correcting or compensating for the curvature or distortion of a bent form. In one embodiment, an external, removable flash memory 19 may contain proprietary software, that is uploaded to the computer processor system 12. In this embodiment, removing the flash memory 19 removes the proprietary software from the computer processor system 12.

The computer network 17 may be a public network, such as the Internet, or a private network, etc., but in any case, information, such as, for example, financial information, may be encrypted to prevent outside interference and protection. In this example, information may be derived from the form and sent via the network 17 to a central controller 15. The central controller 15, in turn, verifies the financial information and authorizes agents to act accordingly.

FIGS. 2A and 2B (not to scale) illustrate some issues that are presented when a bent, rolled, folded or crumpled form 2 is placed before and viewed by a camera 18. In this illustration, a form 2 with a single bend 20 is placed on a platen 5 and illuminated by light 4 from a light source such as an LED array 22. In this illustration, a square mark 24 lies on the bent portion of the form 2, and light 26 from the light source is reflected from the square 24 to the camera 18 The beam of light 26 subtends an angle θ, which is the same angle θ that the light would strike the platen 5 at a location 24' in the absence of the form 2. The size of the square 24 on the form 2, however, is smaller than the square 24' on the platen 5 due to the spread of the light beam 26. The computer processor system 12 is ignorant of the bend 20 and processes the mark at location 24 as if it were at and as large as the mark at 24'. If the analysis of the camera image uses size as a factor in analyzing a mark, the bend will introduce a size error in the image.

FIG. 2B shows a side elevation view of the same illustration set forth in FIG. 2A, where the beam of light 26 intersects the bent form 2 at the square 24 and intersects the platen 5 at 24'. The length of the side view of the square 24 is much shorter than the length of the side view of the square 24'. There are additional problems, however, as illustrated by the diagram in FIG. 2C.

In FIG. 2C, a single dot A is on the bent portion of the form 2. A small beam of light 26 is reflected from A to the camera 18. As above, dot A will be smaller in size to the projection dot A'. But, note that when the bent portion is flattened 28 to the platen 5, the dot A is located at location A". There is an offset 30, a position error, between the projections at A' and A". The image analyzer will process the mark A as if it were located at location A' whereas the true position is at location A".

The bend 20 in the form 2 produces at least a size error and a position error. If the form 2 is curved, curled or has multiple bends the resulting errors will be that much more difficult to accommodate.

Figure 3:
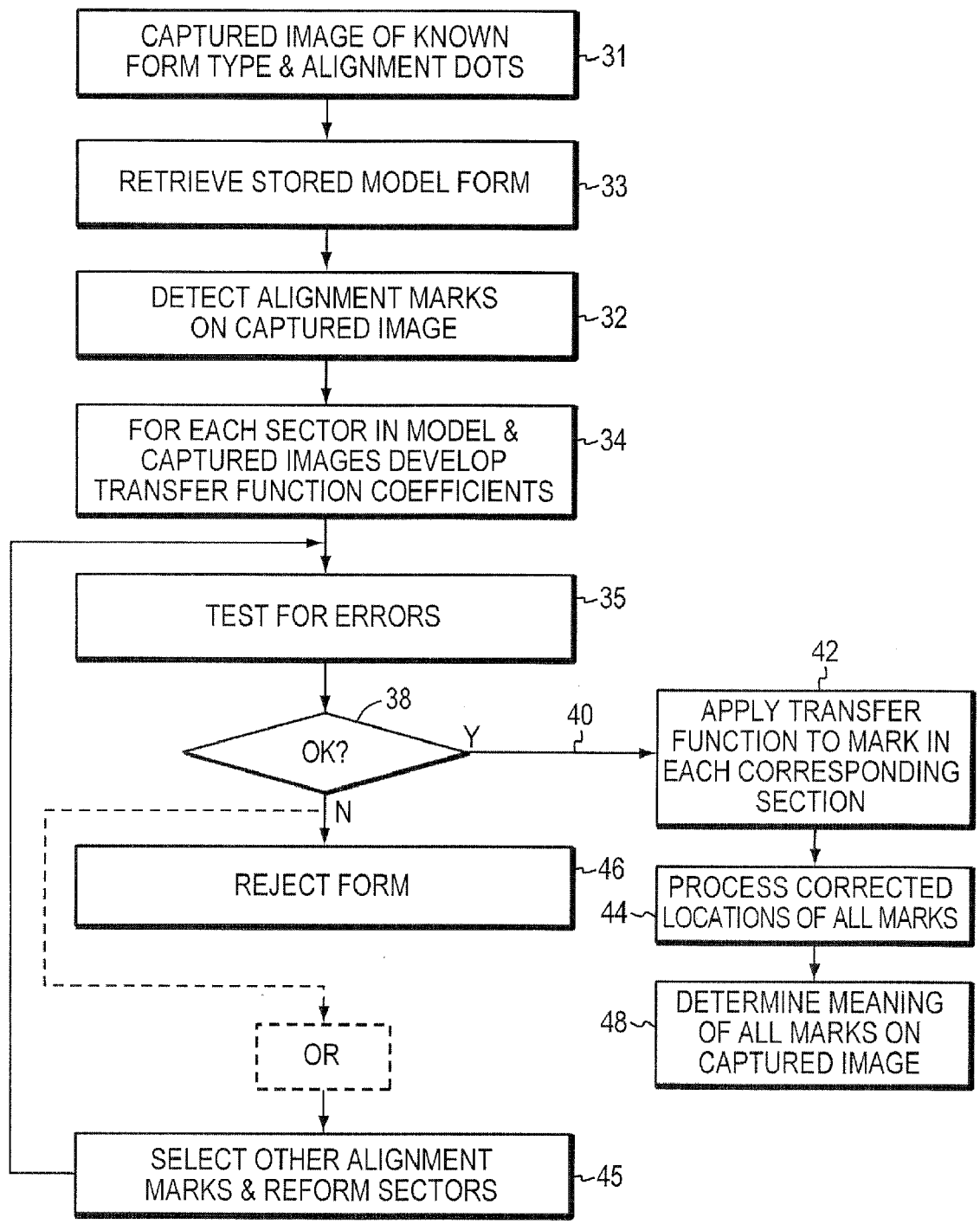
FIG. 3 is a flow chart illustrating a process of the present invention.

FIG. 3 illustrates a method for processing pixel data of a known form according to the present invention. According to this process, and in broad terms, pixel data of an unread image is compared to a model image of the form stored in the processing system memory 180 (FIG. 1). The model image is used as a template that contains the locations of all the alignment marks. The model image form is divided into sectors where the number of alignment marks define each sector and include a transfer function for each sector. The locations of the alignments marks in the stored captured image and the model image determine the coefficients of the transfer functions. The transfer functions are then applied to the locations of marks in the corresponding sectors in the unread images to produce corrected locations, and the meanings of these marks are determined by reference to the corresponding locations in the model image. Meanings of locations of marks on the model image are stored.

To restate in more detail, the process illustrated in FIG. 3 starts with a captured unread image of a known form type that includes marks such as alignment dots or marks 31. A stored model image that corresponds with the unread image of the particular form is retrieved 32. The locations of the alignment marks on the captured image are found 33, and, using the locations of corresponding alignment marks on the model image, the coefficients of a transfer function are found 34.

When a transfer function has been determined for a sector, that function may be applied to other alignment marks in or near that sector. When the comparison is made of the corrected locations of alignment marks in the captured image to the locations of those marks in the model image, an error 35 may be calculated. An error threshold may be established for an error that can be tolerated, and if the error is within the threshold, the form may be processed further as discussed herein. If the error is too large other closer alignment marks may be used, as discussed herein, until an acceptable error is found. If an unacceptable error remains, the form may be rejected 46.

An acceptable error may be one that is smaller than the position error that an analyzing system assigns to an acceptable known location on the form. For example, the area where a mark may be made could be a square of 0.1 inches on a side. A position error of 0.05 inches may be an acceptable error.

If the errors are all acceptable 40, the transfer function for each sector is applied to all the marks within that sector 42, producing corrected locations for all the marks on the captured image 44. The meanings of all the marks, as mentioned above, are found 48 by reference to corresponding locations on the model image.

If the error remains unacceptable, smaller sectors may be successively employed 45 with other alignment marks until a transfer function results in acceptable error for marks in every section of the form. If acceptable errors are not found, the form may be rejected 46.

Illustratively, a form may be divided into triangular and rectangular sectors, but any figure encompassing an area may be used.

In other applications, acceptable errors may be determined by running sample or test forms until the rejection rates of the forms is acceptable. In some applications, acceptable error may be simply estimated.

The following describes a simplistic example illustrating an application of a linear correcting process. FIG. 4 illustrates a top view of a form 50 that is laid flat. Alignment marks 54a, 54b, 54c, and 54d, and 54a', 54b', 54c', and 54d' are arranged as shown. For example, for an illustrative rudimentary linear correction factor, the calculated distance in a stored captured image between alignment marks 54a and 54b may be only 80% of what that distance is on the model image. Using that factor, the distance on the captured image from mark C to mark 54a may be corrected by multiplying that distance by 1/0.8, or by 1.25. Mark C would then be interpreted as a mark at that location on the model image, and the significance of that location on the model will be assigned to mark C. Mark C could be a logo, another alignment mark, or a man-made mark. Note that if the alignment marks were closer together the actual distance error will be reduced accordingly. That is, if a distance of five inches is corrected by 1%, the correction is 0.05 inch, but if the distance is 2.5 inches the same correction factor would be only 0.025 inches. Thus, the closer the alignment marks the smaller the error.

Detection of marks of any kind on a form entails a contrast that allows the edges of the marks, and then characteristics or attributes of the marks to be found. Typically, every form type will have a logo, that is quite different in attributes so that it is easily found and recognized, if one is not found, the form type may be keyed in by an agent or the form rejected. Similarly, alignment marks are distinctive to ease detection.

There are known techniques for detecting edges or marks and for calculating attributes of marks, and are not further discussed herein.

In the embodiment of FIG. 4, analyzing four alignment marks, 54a, 54b, 54c, and 54d, at the four corners of the stored captured image and a model image form may produce a transfer function that when applied results in an acceptable error. If so, the other marks in the stored captured image may be processed by that transfer function. Such an example would quicken the processing of that form.

If any errors are deemed too large, in some applications, additional alignment marks (for example, 54a', 54b', 54c', 54d') may be employed. If these eight alignment marks are used, the form may be divided into three sectors, 52, 53, and 55. A transfer function may be developed for each sector and any marks found within each sector would be corrected using the corresponding transfer function. Alignment marks, moreover, may be placed, where acceptable, within the central portion D of the form. As more sections are used, the processing of the form may take longer. Note, however, that if no other marks are in a sector, that sector need not be processed.

Figure 5A:
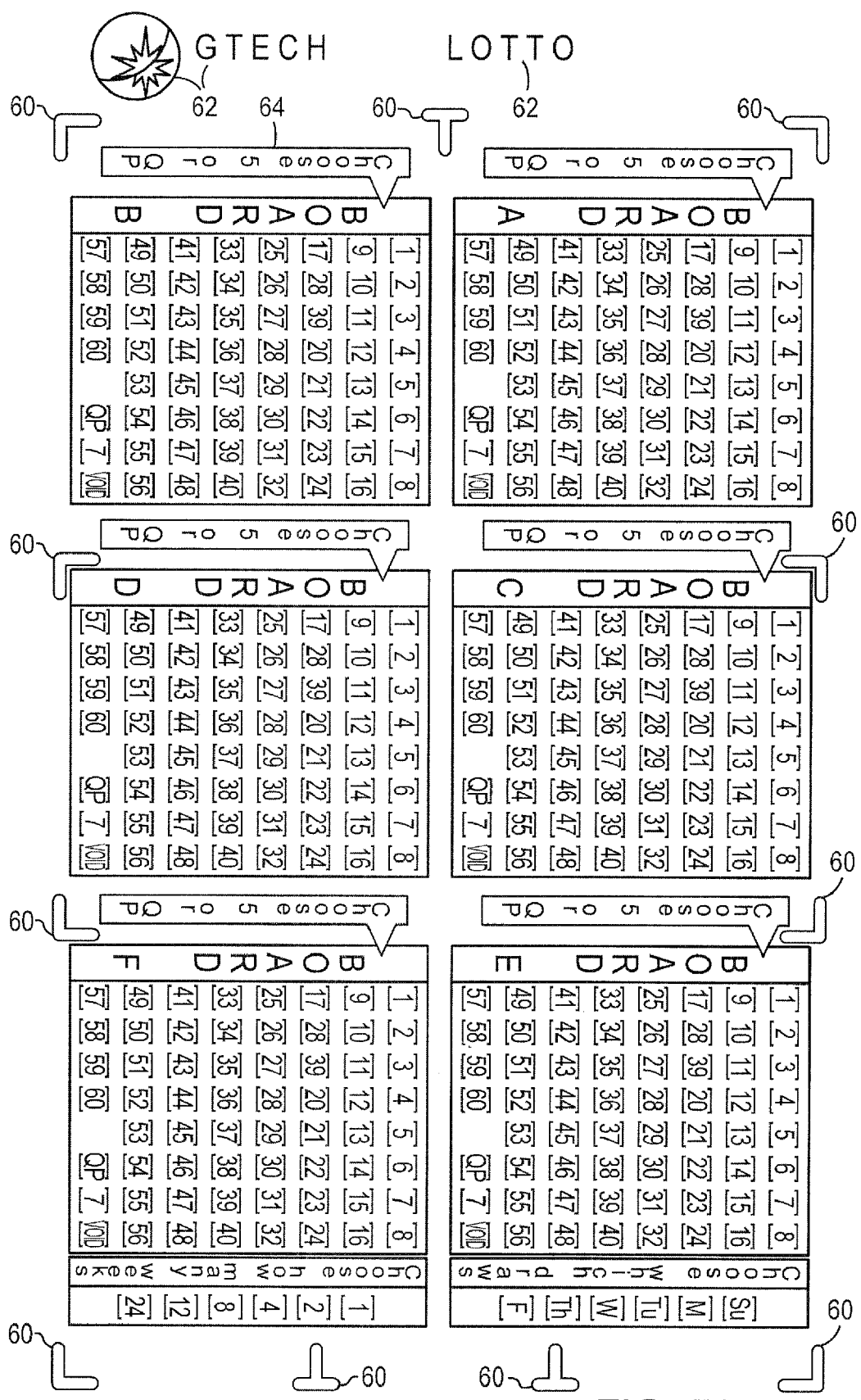
FIGS. 5A, 6A and 7A are examples of examples of forms that may be read using one or more processes of the present invention.
Figure 7B:
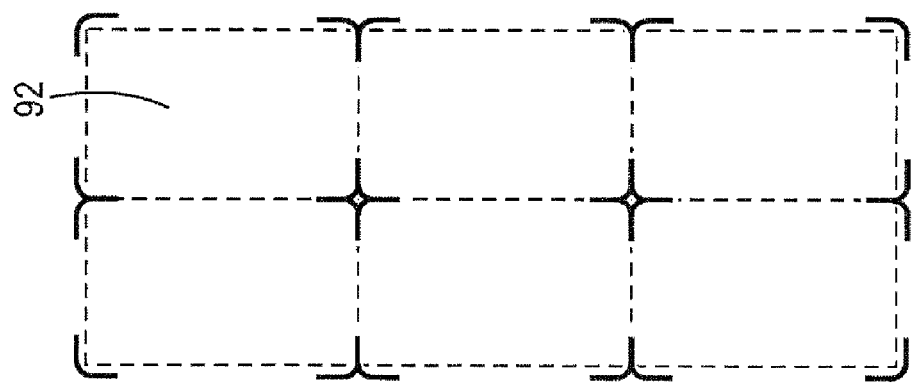
FIGS. 5B, 6B, and 7B illustrate the partitioning of the forms shown in FIGS. 5A, 6A, and 7A, respectively, into sectors in accord with one or more of the processes described in the present patent.
Figure 6B:
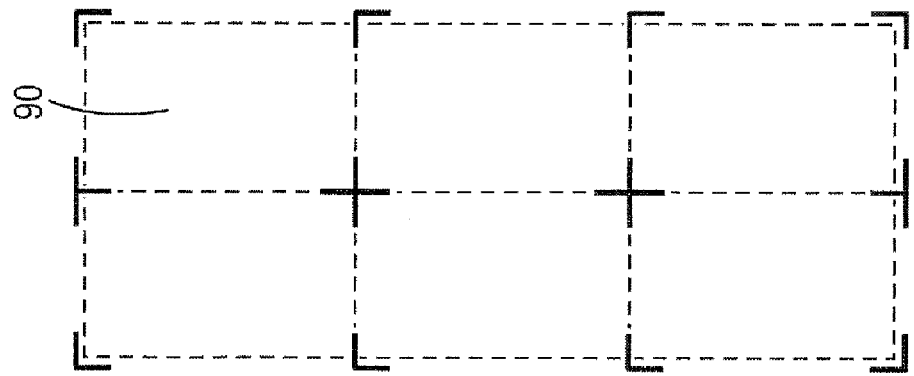
Figure 6A:
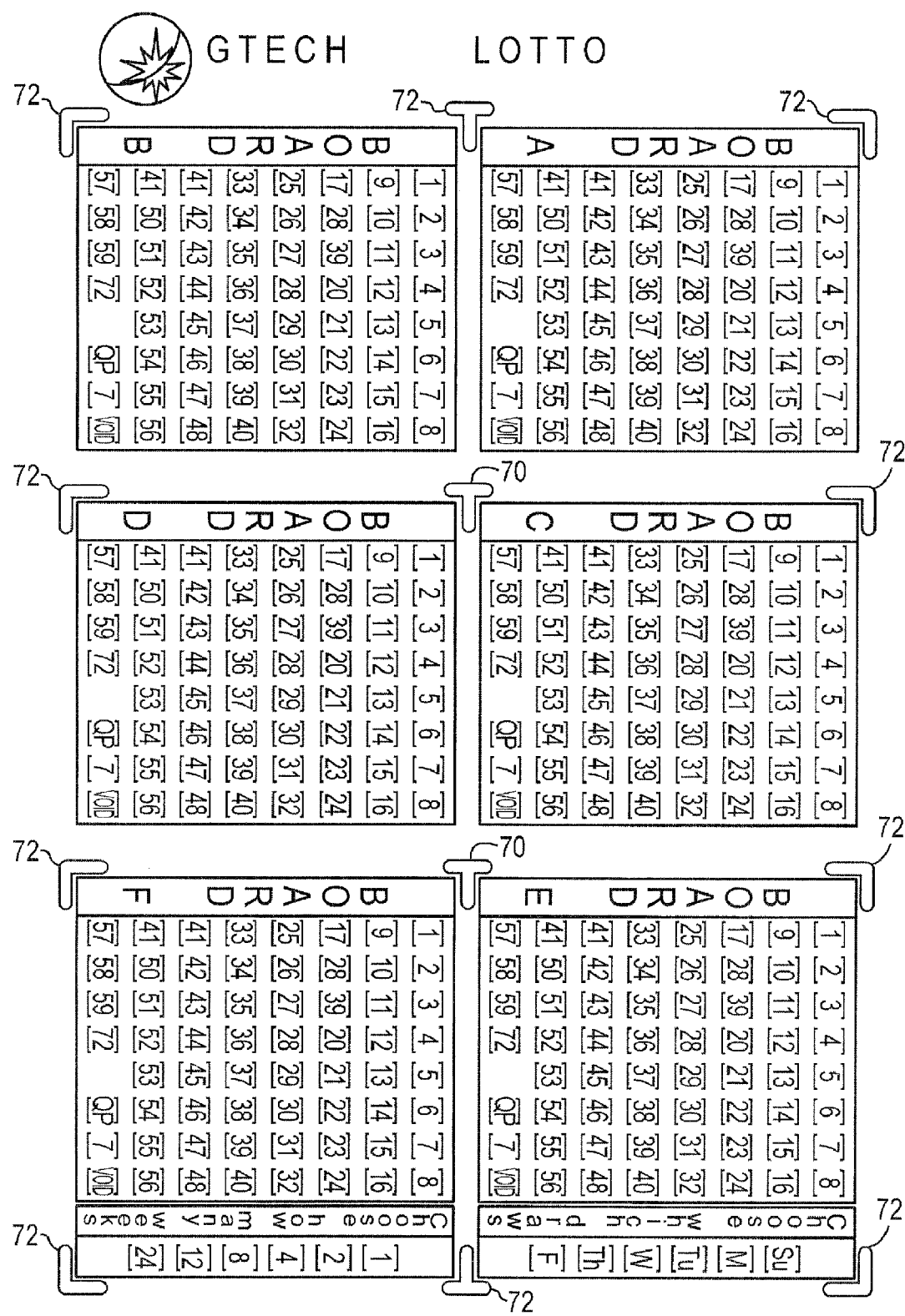
Figure 7A:

FIGS. 5A, 6A and 7A illustrate three exemplary forms. FIG. 5A has eleven alignment marks 60 distributed around the outer periphery of the form. Each alignment mark 60 has a known shape for that form type. FIG. 6A depicts another form type with alignment marks 70 distributed also within the center portion of the form. This form type has ten peripheral alignment marks 72 along with the two 70 central alignment marks.

FIG. 7A is yet another form type. Here, the alignment marks are positioned similarly to those in FIG. 6A, but the center marks 76 and the periphery marks 74 are thinner and not as bold in comparison to those in FIG. 6A. In FIG. 7A, the alignment marks are less obvious and intrusive to a casual viewer.

Figure 5B:
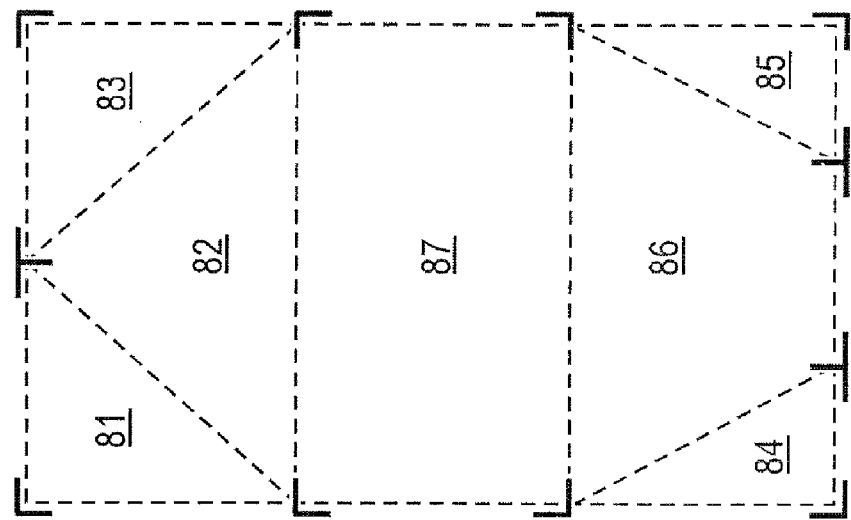

FIGS. 5B, 6B, and 7B illustrate sectoring that may be applied to the corresponding form types shown in FIGS. 5A, 6A and 7A. In FIG. 5B, there are five triangular sectors 81, 82, 83, 84, and 85, and each is formed by three points, and would have a three point transfer function applied as shown herein. FIG. 5B has one rectangular sector 87 and another four-sided sector 86. These four-sided sectors would have a four point transfer function applied.

FIGS. 6B and 7B are shown with six rectangular or square sectors 90 and 92, respectively. Four point transfer functions would be developed for each of these sectors.

The Transfer Functions:

Restating from above, since a rectangular form, for example, is only a sheet of paper, it often will have distortions that might cause reading problems. Straight lines, etc. on the paper form will not necessarily be straight lines on the captured image. The template or model image of the form, however, will represent a flat, usually rectangle form with undistorted marks and lines. The present invention provides for non-linear transfer functions that compensate or correct for curvature distortions on the captured image.

As mentioned above, according to one or more embodiments of the present invention, each model image of a form may be partitioned into a number of sectors, some defined by three alignment marks, others by four alignment marks and yet others may be defined by more than four such marks.

Three Point Equations and Solution

If a sector is defined by three alignment marks, a transfer function that applies to the locations within the sector may be as follows:

$$x' = A'x + B'y + C' \qquad \text{Eq. 1, and}$$

$$y' = D'x + E'y + F' \qquad \text{Eq. 2.}$$

Once the six coefficients (A, B, C, D, E, and F) are derived for a specific captured image, Eqs. 1 and 2 may be applied to translate any location (x, y) on the model image to the corresponding coordinate (x', y') on the captured image.

The following discussion illustrates one way to solve these equations. Eqs. 1 and 2 may be arranged into matrix form as follows:

To Solve for A, B, and C:

$$\begin{pmatrix} x_0 & y_0 & 1 & | & x'_0 \\ x_1 & y_1 & 1 & | & x'_1 \\ x_2 & y_2 & 1 & | & x'_2 \end{pmatrix}$$

To Solve for D, E, and F:

$$\begin{pmatrix} x_0 & y_0 & 1 & | & y'_0 \\ x_1 & y_1 & 1 & | & y'_1 \\ x_2 & y_2 & 1 & | & y'_2 \end{pmatrix}$$

Because of the simplicity of the matrix, Cramer's Rule can be used to solve this easily. For example:

$$A = \frac{\begin{pmatrix} x'_0 & y_0 & 1 \\ x'_1 & y_1 & 1 \\ x'_2 & y_2 & 1 \end{pmatrix}}{\begin{pmatrix} x_0 & y_0 & 1 \\ x_1 & y_1 & 1 \\ x_2 & y_2 & 1 \end{pmatrix}}$$

Four Point Equations and Solution

If a sector is defined by four alignment marks, a transfer function that may apply to the locations within the sector may be defined as follows:

$$x' = \frac{Ax + By + C}{Gx + Hy + 1}, \qquad \text{Eq. 3}$$

and $$y' = \frac{Dx + Ey + F}{Gx + Hy + 1}. \qquad \text{Eq. 4}$$

Once the eight coefficients (A, B, C, D, E, F, G, and H) are derived for a specific captured image, Eqs. 3 and 4 can be used to translate any location (x, y) on the model image to the corresponding coordinate (x', y') in the captured image.

The following discussion illustrates one way to solve these equations. Eqs. 3 and 4 may be rearranged in more matrix-like form as follows:

$$A \cdot x + B \cdot y + C \cdot 1 + D \cdot 0 + E \cdot 0 + F \cdot 0 - G \cdot x \cdot x' - H \cdot y \cdot x' = x' \quad \text{Eq. 5, and}$$

$$A \cdot 0 + B \cdot 0 + C \cdot 0 + D \cdot x + E \cdot y + F \cdot 1 - G \cdot x \cdot y' - H \cdot y \cdot y' = y' \quad \text{Eq. 6.}$$

Eqs. 5 and 6, then, may be solved as a system of equations using Gaussian Elimination. According to Gaussian Elimination, assembly of the following 8×9 augmented matrix is required and upper triangulation and back substitution is applied:

$$\begin{pmatrix} x_0 & y_0 & 1 & 0 & 0 & 0 & -x_0 x'_0 & -y_0 x'_0 & | & x'_0 \\ x_1 & y_1 & 1 & 0 & 0 & 0 & -x_1 x'_1 & -y_1 x'_1 & | & x'_1 \\ x_2 & y_2 & 1 & 0 & 0 & 0 & -x_2 x'_2 & -y_2 x'_2 & | & x'_2 \\ x_3 & y_3 & 1 & 0 & 0 & 0 & -x_3 x'_3 & -y_3 x'_3 & | & x'_3 \\ 0 & 0 & 0 & x_0 & y_0 & 1 & -x_0 y'_0 & -y_0 y'_0 & | & y'_0 \\ 0 & 0 & 0 & x_1 & y_1 & 1 & -x_1 y'_1 & -y_1 y'_1 & | & y'_1 \\ 0 & 0 & 0 & x_2 & y_2 & 1 & -x_2 y'_2 & -y_2 y'_2 & | & y'_2 \\ 0 & 0 & 0 & x_3 & y_3 & 1 & -x_3 y'_3 & -y_3 y'_3 & | & y'_3 \end{pmatrix}$$

Biquadratic Transformation Applied to Curvature Correction

When more than four alignment marks are used to define a sector, a transfer function that may apply to the locations within the sector may be defined by the following biquadratic equation, which represents a bi-quadratic transformation:

$$x' = a_1 + a_2 x + a_3 y + a_4 xy + a_5 x^2 + a_6 y^2 + a_7 xy^2 + a_8 x^2 y \quad \text{Equation 7}$$
$$\equiv \sum_{n=1,8} a_n u_n(x, y)$$
$$= UA''$$

$$y' = b_1 + b_2 x + b_3 y + b_4 xy + b_5 x^2 + b_6 y^2 + b_7 xy^2 + b_8 x^2 y$$
$$\equiv \sum_{n=1,8} b_n u_n(x, y)$$
$$= UB''$$

Where A'' and B'' are coefficients matrices of the transformation and can be expressed as two 1×8 matrices respectively:

$$A'' \equiv \begin{bmatrix} a_1 \\ a_2 \\ a_3 \\ a_4 \\ a_5 \\ a_6 \\ a_7 \\ a_8 \end{bmatrix} \quad B'' \equiv \begin{bmatrix} b_1 \\ b_2 \\ b_3 \\ b_4 \\ b_5 \\ b_6 \\ b_7 \\ b_8 \end{bmatrix}$$

And U is an 1×8 matrix, its transpose matrix, $U^T$, is an 8×1 matrix. $U^T$ instead of U is defined below for clarity:

$$U^T \equiv \begin{bmatrix} u_1(x, y) \\ u_2(x, y) \\ u_3(x, y) \\ u_4(x, y) \\ u_5(x, y) \\ u_6(x, y) \\ u_7(x, y) \\ u_8(x, y) \end{bmatrix} \equiv \begin{bmatrix} 1 \\ x \\ y \\ xy \\ x^2 \\ y^2 \\ xy^2 \\ x^2 y \end{bmatrix}$$

That means, $u_n = u_n(x, y)$, with $n = 1, 2, \ldots, 8$, are functions of x and y.

This eight-point transfer function needs eight reference points to determine the coefficients matrices A'' and B''.

Assume one has eight reference points in the template or model image:

$$P_1(x_1, y_1), P_2(x_2, y_2), P_3(x_3, y_3), P_4(x_4, y_4), P_5(x_5, y_5), P_6(x_6, y_6), P_7(x_7, y_7), P_8(x_8, y_8)$$

And also eight corresponding points in the captured space:

$$P_1'(x'_1, y'_1), P_2'(x'_2, y'_2), P_3'(x'_3, y'_3), P_4'(x'_4, y'_4), P_5'(x'_5, y'_5), P_6'(x'_6, y'_6), P_7'(x'_7, y'_7), P_8'(x'_8, y'_8)$$

Substituting these eight points to Eq. 1, one has (for $j = 1, 2, \ldots, 8$):

$$x'_j = \sum_{n=1,8} a_n u_n(x_j, y_j)$$
$$y'_j = \sum_{n=1,8} b_n u_n(x_j, y_j)$$

Or in matrix form, the above two lines become:

$$X' = QA'',$$

$$Y' = QB'' \quad \text{Equation 8}$$

Where matrices A and B are the same as above, and matrices X', Y', Q are defined below:

$$X' = \begin{bmatrix} x'_1 \\ x'_2 \\ x'_3 \\ x'_4 \\ x'_5 \\ x'_6 \\ x'_7 \\ x'_8 \end{bmatrix}, \ldots Y' = \begin{bmatrix} y'_1 \\ y'_2 \\ y'_3 \\ y'_4 \\ y'_5 \\ y'_6 \\ y'_7 \\ y'_8 \end{bmatrix}$$

$$Q_{jn} \equiv u_n(x_j, y_j)$$

In Eq. 8, X', Y', Q are all known, but A and B are unknowns to be solved.

If matrix Q is singular, the above two linear systems given by Eq. 2 have no solution and one must select different 8 reference points than above.

If matrix Q is non-singular, one can solve the coefficient matrix A and B from Eq. 2 and obtain $$A''=Q^{-1}X'$$

$$B''=Q^{-1}Y' \quad \text{Equation 9}$$

Where $Q^{-1}$ is the inverse of matrix Q.
Substituting A and B into Eq. 1 leads to $$x'=UA''=UQ^{-1}X'$$

$$y'=UB''=UQ^{-1}Y' \quad \text{Equation 10}$$

Or equivalently, $$x' = \sum_{j=1,8} \sum_{n=1,8} Q_{nj}^{-1} u_n(x,y) x'_j \quad \text{Equation 11}$$

$$y' = \sum_{j=1,8} \sum_{n=1,8} Q_{nj}^{-1} u_n(x,y) y'_j$$

Here, $x'_j$ and $y'_j$, with $j=1, 2, \ldots, 8$, are known coordinates of the pre-selected eight reference points in the captured space. $Q^{-1}$ is also known since it depends only on the coordinates $(x_j, y_j)$ of the pre-selected eight reference points in the template or model image. For any given point $(x, y)$ in the template, $u_n(x, y)$, with $n=1, 2, \ldots, 8$, can be calculated. Therefore, for any point $(x, y)$ in the template, the corresponding point $(x', y')$ of the captured space can be obtained from the above two equations.

Actually $Q^{-1}$ can be computed offline to speed up the transformation. That means, we do not have to compute $Q^{-1}$ for every pair of $(x, y)$ to $(x', y')$ transformation. It can be computed only once after the eight reference points in the template are selected.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A process for reading information on an unread form, the process comprising the steps of:
storing a model image of a model of the unread form in a computer system, the model image containing alignment marks;
storing an unread image of the unread form in the computer system, the unread image containing alignment marks that correspond to the alignment marks on the model image;
partitioning the model image into a group of sectors, wherein each sector is defined by the locations of at least three alignment marks;
detecting the sectors on the unread image that correspond to the sectors on the model image by comparing the alignment marks on the model image to the corresponding alignment marks on the unread image;
generating a transfer function for each sector of the unread image from the locations of corresponding alignment marks of the model image and the unread image;
applying each sector's transfer function to the locations of marks on the corresponding sector of the unread image to generate a corrected unread image with corrected locations of the marks; and
reading information on the corrected unread image of the unread form.

2. The process of claim 1, further comprising the steps of:
forming a coordinate system for each sector of the unread image, wherein the transfer function for each sector compensated for distortions in the unread image, and
determining the meanings of the corrected locations of the marks within each sector of the unread image by reference to corresponding locations within each sector of the model image.

3. The process of claim 2, wherein the sector is defined by the location of three alignment marks and the process further comprises the step of:
applying a three point transfer function equation to each sector defined by three alignment marks.

4. The process of claim 3, further comprising the steps of:
constructing an x, y coordinate system for the location of marks in the model image and an x', y' coordinate system for marks in the unread image, wherein the three mark transfer function is:

$$x'=A'x+B'y+C' \text{ and } y'=D'x+E'y=F'.$$

5. The process of claim 2, wherein the sector is defined by the location of four alignment marks and the process further comprises the step of:
applying a four point transfer function equation to each sector defined by four alignment marks.

6. The process of claim 5, further comprising the steps of:
constructing an x, y coordinate system for the location of marks in the model form image and x', y' coordinate system for marks in the unread form image, wherein the four mark transfer function is:

$$x' = \frac{Ax+By+C}{Gx+Hy+1}$$

and $$y' = \frac{Dx+Ey+F}{Gx+Hy+1}.$$

7. The process of claim 2, further comprising the steps of applying a multi-mark transfer function to each sector of the unread form image defined by eight alignment marks, wherein the transfer function is $$x' = a_1 + a_2 x + a_3 y + a_4 xy + a_5 x^2 + a_6 y^2 +$$
$$a_7 xy^2 + a_8 x^2 y$$
$$\equiv \sum_{n=1,8} a_n u_n(x,y)$$
$$= UA''$$

and $$y' = b_1 + b_2 x + b_3 y + b_4 xy + b_5 x^2 + b_6 y^2 +$$
$$b_7 xy^2 + b_8 x^2 y$$
$$\equiv \sum_{n=1,8} b_n u_n(x,y)$$
$$= UB''.$$

8. The process of claim 1, further comprising the steps of:
generating corrected locations of specific marks on the unread image, wherein the locations of the specific marks on the model image are known;
calculating a difference between the corrected locations of the specific marks on the unread image to the corresponding known locations of the specific marks on the model image;

establishing an error threshold; and comparing the difference to the threshold, and rejecting the form if the difference exceeds the threshold.

9. The process of claim 1, wherein the unread form is selected from the group consisting of a printed document, a play slip, a lottery scratch ticket and a lottery instant ticket.

10. A system for processing and correcting markings on a known form, the system comprising:

a light source that illuminates a form that reflects some of the light;

a camera arranged to receive the reflected light from the form and capture an unread image of the form;

camera electronics to extract the unread image of the form from the camera, the unread image having alignment marks at locations;

a computer processing system in communication with the camera electronics, the computer processing system comprising:

at least one memory configured to store:

the unread image of the form:

a model image of the form having alignment marks;

sectors defined by the locations of the alignment marks; and a transfer functions for each sector from the locations of corresponding alignment marks of the stored unread and model images; and at least one processor configured to execute an application that generates corrected locations of the alignment marks within each sector of the stored unread image by application of the transfer function to the alignment marks within each sector of the stored unread image.

11. The system of claim 10, further comprising:

a coordinate system for locations on the stored unread and the model images; and an application that determines the meanings of marks with corrected location by reference to the corresponding locations on the model image.

12. The system of claim 11, further comprising:

specific marks with corrected locations on the stored unread image and corresponding specific marks on the model image, wherein the locations of the specific marks on the model image are known;

a calculator for calculating a difference between the corrected locations of the specific marks on the unread image to the corresponding known locations of the specific marks on the model image;

an error threshold; and a comparator that compares the difference to the error threshold and rejects the form if the difference exceeds the threshold.

13. The system of claim 10, wherein the known form is selected from the group consisting of a printed document, a play slip, a lottery scratch ticket and a lottery instant ticket.

14. A computer readable medium encoded with computer executable program instructions for determining the location of marks on a known type of form, the computer executable program instructions comprising one or more program instructions for performing the steps of:

storing a model image of a model of the unread form in a computer system, the model image containing alignment marks;

storing an unread image of the unread form in the computer system, the unread image containing alignment marks that correspond to the alignment marks on the model image;

partitioning the model image into a group of sectors, wherein each sector is defined by the locations of at least three alignment marks;

detecting the sectors on the unread image that correspond to the sectors on the model image by comparing the alignment marks on the model image to the corresponding alignment marks on the unread image;

generating a transfer function for each sector of the unread image from the locations of corresponding alignment marks of the model image and the unread image; and applying each sector's transfer function to the locations of marks on the corresponding sector of the unread image to generate corrected locations of the marks, thereby enabling the reading of the unread form.

15. The computer readable medium of claim 14, further comprising program instructions for performing the steps of:

forming a coordinate system for each sector, wherein the transfer function for each sector compensates for distortions, determining the meanings of the corrected locations of the marks within each sector of the unread image by reference to corresponding locations of marks within each sectors of the model image; and applying a three mark transfer function to each sector defined by three alignment marks.

16. The computer readable medium of claim 15, wherein the three mark transfer function is:

$$x'=A'x+B'y+C' \text{ and } y'=D'x+E'y=F'.$$

17. The computer readable medium of claim 14, further comprising program instructions for performing the steps of:

forming a coordinate system for each sector, wherein the transfer function for each sector compensates for distortions, determining the meanings of the corrected locations of the marks within each sector of the unread image by reference to corresponding locations of marks within each sector of the model image; and applying a four mark transfer function to each sector defined by four alignment marks.

18. The computer readable medium of claim 17, wherein the four mark transfer function is:

$$x' = \frac{Ax + By + C}{Gx + Hy + 1}$$

and $$y' = \frac{Dx + Ey + F}{Gx + Hy + 1}.$$

19. The computer readable medium of claim 14, further comprising program instructions for performing the steps of:

forming a coordinate system for each sector, wherein the transfer function for each sector compensates for distortions, determining the meanings of the corrected locations of the marks within each sector of the unread image by reference to corresponding locations of marks within each sector of the model image; and applying a multi-mark transfer function to each sector defined by eight alignment marks, wherein the transfer function is $$x' = a_1 + a_2 x + a_3 y + a_4 xy + a_5 x^2 + a_6 y^2 + a_7 xy^2 + a_8 x^2 y$$
$$\equiv \sum_{n=1,8} a_n u_n(x, y)$$
$$= UA''$$

and $$y' = b_1 + b_2 x + b_3 y + b_4 xy + b_5 x^2 + b_6 y^2 + b_7 xy^2 + b_8 x^2 y$$
$$\equiv \sum_{n=1,8} b_n u_n(x, y)$$
$$= UB''.$$

20. The computer readable medium of claim 14, further comprising program instructions for performing the step of:
determining the meanings of the corrected locations of the marks within each sector of the unread image by reference to corresponding locations of marks within each sector of the model image.

* * * * *